UNITED STATES PATENT OFFICE.

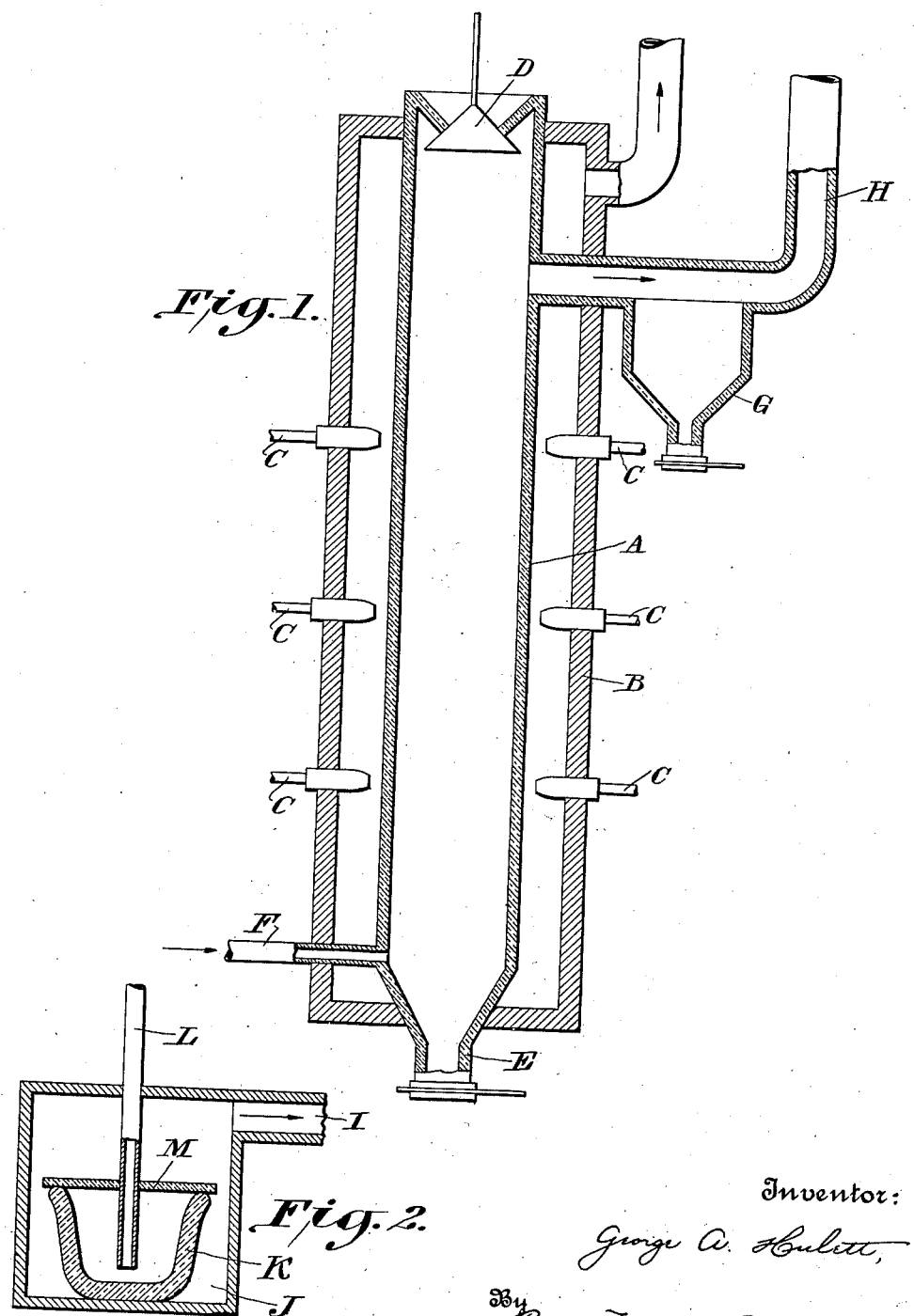

GEORGE AUGUSTUS HULETT, OF PRINCETON, NEW JERSEY.

PROCESS OF PURIFYING INORGANIC MATERIALS.

1,368,396.     Specification of Letters Patent.     Patented Feb. 15, 1921.

Application filed March 22, 1919. Serial No. 284,314.

*To all whom it may concern:*

Be it known that I, GEORGE A. HULETT, a citizen of the United States, residing at Princeton, in the county of Mercer and State of New Jersey, have invented certain new and useful Improvements in Processes of Purifying Inorganic Materials, of which the following is a specification.

The invention relates to a process for removing iron and other volatilizable ingredients from inorganic materials such as sand, clay, and other like mineral substances, or finished products or articles in the ceramic or refractory arts. The process consists in subjecting the materials as above specified while heated to a suitable temperature to the action of phosgen gas or highly active dissociation products thereof.

When the material is in granular form the purification may be effected by passing a current of phosgen gas through or over the material contained in a suitable receptacle, such as a glass tube or enameled ware retort maintained at a suitable temperature, the iron and other metallic impurities being volatilized or sublimed.

The method is also applicable to articles of manufacture such as clay pots, crucibles, bricks, etc., in which case the article preferably heated to the requisite temperature is subjected to the action of the phosgen gas by passing the gas into or through the article.

Diagrammatic illustrations of an apparatus which may be employed are shown in the accompanying drawings in which—

Figure 1 is a sectional view of an apparatus for treating granular material; and Fig. 2 is a sectional view of an arrangement for treating an already formed article.

Referring to Fig. 1, A is a retort of glass, enameled ware or other material not attacked by phosgen at the operating temperature. This retort is heated in any suitable manner as by burners C or by electricity. At the top, the retort may be provided with a charge hopper or bell D, and at the bottom is provided with a valved discharge E. The phosgen is introduced, preferably under some pressure through pipe F. The volatilized reaction products escape into an enlarged chamber G, in which the condensible chlorids collect, the residual gases passing to the stack H, in which a good draft is maintained by any suitable means. It is preferable that the upper portion of the chamber and exit flue be kept slightly below atmospheric pressure, so that there will be no tendency for the poisonous phosgen gas to escape into the surrounding atmosphere.

In operation the preferably thoroughly dried granular material, such as sand, clay or the like is fed into the upper portion of the heated retort and passes downwardly therethrough, being in such passage raised to the necessary temperature, from 350° to 600° C. and subjected to the upwardly flowing current of phosgen gas. As the result of the reaction the iron compounds and other chloridizable materials are volatilized. It has been ascertained that the undissociated $COCl_2$, or possibly highly active dissociation products thereof, is the active agent, inasmuch as similar results are not obtained under these conditions with a mechanical mixture of $Cl_2$ and CO in molecular proportions.

The process has been found to be exceedingly effective for the purification of sand which is to be used for glass making.

As stated above a mixture prepared by commingling carbon monoxid and chlorin in molecular proportions is not equivalent to phosgen as a reagent for the purposes of this invention. This has been experimentally determined, for example in the following manner:

In experiments upon Hancock sand, commonly employed in the manufacture of optical glass, comparative tests were made with $Cl_2$, $Cl_2+CO$, and phosgen. The observation was made that a mechanical mixture of chlorin and carbon monoxid in equal volumes gave results identical with those obtained by chlorin alone: the treated sand in each case acquired a decided pink cast, although originally white. The reaction, both as regards appearance and chemical analysis of the product, was identical in the two cases, the difference shown by analysis in the residual iron content being well within the limits of error in the colorimetric iron determination.

When, however, phosgen was used under identical conditions as to temperature and time of treatment and volume of gas, the product was found to be white in color and of much lower iron content.

The following table gives the iron content calculated as $Fe_2O_3$ of the original sand and of the several treated products:

Sand before treatment_____ 0.0134% $Fe_2O_3$
Sand treated with $Cl_2$_____ 0.0117% $Fe_2O_3$
Sand treated with $Cl_2$ and CO _____ 0.0119% $Fe_2O_3$
Sand treated with phosgen_ 0.0030% $Fe_2O_3$ In another case an iron content of 0.014 per cent. in a silica sand was reduced in about one hour at 550° C. to 0.002 per cent. The alumina sometimes associated with the iron was also found to be substantially removed so that a chemically pure silica suitable for making optical glass or fused quartz articles was obtained.

In Fig. 2, I have illustrated the method as applied to clay pots such as are used for making glass. J is a chamber, which may or may not be heated and is provided with an exit flue I. The pot, K, to be purified is preferably preliminarily heated to nearly red heat and provided with a substantially gas-tight cover M, through which extends a pipe L for introducting phosgen. The iron contained within the walls of the pot is volatilized, the products passing out through the exit I.

It has been found that the rate at which the phosgen acts upon the metallic ingredients depends very largely on the condition in which they exist in the raw material.

When the materials are in crystalline form they are as a rule attacked by phosgen gas only to a slight degree; while materials which are in an amorphous form are readily attacked at temperatures below the red heat. This discovery I utilize by removing amorphous impurities from crystalline materials.

Thus, in sand, in which the silica is in crystalline form, the iron is readily attacked, while the silica is only slightly affected even when subjected to the treatment for long periods of time.

The phosgen may readily be prepared by passing a mixture of chlorin gas and carbon monoxid gas over a catalyst, such as charcoal preferably heated to about 100° C.

I claim:

1. The process which consists in subjecting inorganic materials containing iron and other volatilizable ingredients, while maintained at a temperature of from 350° C. to 600° C. to the action of phosgen gas, until the iron and other volatilizable ingredients are removed.

2. The process which consists in subjecting silicious materials containing iron and other volatilizable ingredients, while maintained at a temperature of from 350° C. to 600° C. to the action of phosgen gas, until the iron and other volatilizable ingredients are removed.

3. The process which consists in subjecting sand containing iron and other volatilizable ingredients, while maintained at a temperature of from 350° C. to 600° C. to the action of phosgen gas, until the iron and other volatilizable ingredients are removed.

4. The process which consists in subjecting silicious material containing iron and other volatilizable ingredients, to the action of phosgen gas while said material is heated to a temperature sufficient to effect volatilization of the said ingredients and continuing the operation until a substantially pure silicious product is obtained.

5. The process which consists in subjecting inorganic material containing iron and other volatilizable ingredients, to the action of phosgen gas, while said material is heated to a temperature sufficient to effect a volatilization of the said ingredients and continuing the operation until a substantially pure product is obtained.

6. The process of purifying inorganic materials which consists in subjecting such materials at a relatively low temperature to the action of phosgen whereby impurities are eliminated by volatilization.

7. The process of purifying crystalline products containing amorphous impurities which consists in subjecting them at a relatively low temperature to the action of phosgen whereby the impurities are eliminated by volatilization.

8. The process of purifying crystalline products containing amorphous impurities which consists in subjecting them at a temperature of from 350° to 600° C. to the action of phosgen whereby the impurities are eliminated by volatilization.

In testimony whereof I affix my signature.

GEORGE AUGUSTUS HULETT.